Patented July 25, 1933

1,920,161

UNITED STATES PATENT OFFICE

HAROLD M. ROSEN, OF MUSKEGON, MICHIGAN

LUBRICANT

No Drawing.   Application filed December 14, 1931. Serial No. 581,066.

This invention relates generally to a lubricating composition and more particularly to a lubricant which will remain a solid at ordinary temperatures.

One objection to the use of lubricants in some situations is that the lubricant is of fluid or semi-fluid consistency whereby it does not have sufficient body to remain in its proper location and hence it is soon dissipated therefrom with the result that it must be renewed at frequent intervals. Another disadvantage of the use of present day lubricant in certain places, such as in the dovetails of automobile doors, is that such is inherently sticky due to the presence of free oil therein and thus soiling of clothing very frequently occurs.

One of the primary advantages of my invention resides in the fact that the lubricant remains solid at ordinary temperatures and hence the aforesaid objections are both removed. The substance which I have invented is comprised of ingredients so combined as to be free from any free oil and hence no soiling of clothes is had. Also, the lubricant body is heavy and viscous and remains where placed thus giving a long lived lubricating film.

Briefly described, my invention consists in combining paraffin with petroleum jelly and oil. Sometimes, if desired, the oil may be omitted and paraffin and petroleum jelly combined in such quantities as to produce a dry lubricant without the oil. However, it is preferable to utilize all three of the ingredients.

Common paraffin, such being inert and indifferent chemically, forms the base for my composition and such remains unmelted upon the surfaces which are being lubricated and adheres thereto, providing a base for the oil which is contained therein. The oil adds its lubricating qualities to the inherent slickness of the paraffin.

I preferably combine the several ingredients of my lubricant by melting the paraffin and adding melted petroleum jelly thereto and finally adding mineral oil as desired, and then thoroughly mixing these several ingredients.

Next, the mixture is poured into molds, preferably of cylindrical stick shape, and allowed to cool. Thus sticks are formed.

The paraffin which is utilized preferably melts at about 136° Fahr. and 50% of the finished product may be paraffin.

The petroleum jelly used is approximately 30% and the mineral oil 20%. The more oil that is utilized in the mixture, the lower the melting point thereof. I have found that the combination above recited gives a product which melts at substantially 110° Fahr. and hence at temperatures below this the lubricant is absolutely stainless as the oil therein is not free but is combined with the paraffin and it is only when the temperature is raised above 110° Fahr. that the composition will stain articles such as clothing.

It is to be understood that I may use any oil, such as mineral oil, castor oil or white oil. Also, I deem it within the range of my invention to vary the amount of paraffin and the petroleum jelly, the texture being so regulated that the oil is entirely solidified by the paraffin at or above the temperature at which the lubricant is to be used.

From the above description, it will be appreciated that I have inventively created a composition which is particularly adapted for use in the dovetail of the doors of automobiles whereby the same will provide lubricating qualities therefor and furthermore will not damage the clothing of anyone coming in contact therewith. Also, my lubricant is applicable to the use of desk drawers, which often times become stuck, and here also the danger of soiling ones clothing is eliminated. The paraffin in the substance gives it a body which lasts for weeks and also such body holds the lubricant where it is applied.

Furthermore, my composition is particularly adaptable for the hood lacings of automobiles as it provides a clean lubricating film which is impervious to weather and consequently the lacing is protected as well as squeaks eliminated. However, it is to be understood that my lubricant is applicable to many uses and all uses are deemed to be within the purview of my invention as set forth in the following claims.

I claim:

1. A lubricant consisting of paraffin, petroleum jelly and oil, said volumetric proportions of the ingredients being as follows:—paraffin 50 parts, petroleum jelly 30 parts, and oil 20 parts.

2. A composition of stick form for lubricating dovetails of automobile doors consisting of paraffin, petroleum jelly and oil, said paraffin being of such quantity as to totally and completely absorb the other two ingredients whereby a dry lubricant without free oil is obtained, the amount of oil being less than the amount of petroleum jelly for the purpose described.

3. A lubricant comprising a base of paraffin or other inert substance having a melting point above 113°, said substance having an affinity for petroleum jelly, and petroleum jelly added to said substance, said oil and said jelly being of such quantity as to be totally absorbed in said substance whereby said lubricant is solid at room temperature.

4. A brittle lubricant of the class described consisting of petroleum jelly of salve-like consistency at room temperature and paraffin, said paraffin being of sufficient qunatity to not only entirely absorb the liquid ingredients of the petroleum jelly but also to render the resulting product of a dry and brittle characteristic whereby clothes and the like are not soiled by contact therewith.

5. A brittle oil or lubricant of the class described consisting of a hydrocarbon compound having relatively high lubricating properties and being of relatively high viscosity at room temperature and paraffin, said paraffin being of sufficient quantity to not only entirely and completely absorb the liquid ingredients of the said hydrocarbon compound but also to render the resulting product of a dry and brittle characteristic whereby clothes and the like are not soiled by contact therewith.

HAROLD M. ROSEN.

CERTIFICATE OF CORRECTION.

Patent No. 1,920,161.  July 25, 1933.

HAROLD M. ROSEN.

It is hereby certified that error appears in the printed specification of the above numbered patent requiring correction as follows: Page 2, line 22, claim 3, strike out the words "said oil and"; and that the said Letters Patent should be read with this correction therein that the same may conform to the record of the case in the Patent Office.

Signed and sealed this 26th day of September, A. D. 1933.

F. M. Hopkins (Seal)  Acting Commissioner of Patents.

I claim:

1. A lubricant consisting of paraffin, petroleum jelly and oil, said volumetric proportions of the ingredients being as follows:—paraffin 50 parts, petroleum jelly 30 parts, and oil 20 parts.

2. A composition of stick form for lubricating dovetails of automobile doors consisting of paraffin, petroleum jelly and oil, said paraffin being of such quantity as to totally and completely absorb the other two ingredients whereby a dry lubricant without free oil is obtained, the amount of oil being less than the amount of petroleum jelly for the purpose described.

3. A lubricant comprising a base of paraffin or other inert substance having a melting point above 113°, said substance having an affinity for petroleum jelly, and petroleum jelly added to said substance, said oil and said jelly being of such quantity as to be totally absorbed in said substance whereby said lubricant is solid at room temperature.

4. A brittle lubricant of the class described consisting of petroleum jelly of salve-like consistency at room temperature and paraffin, said paraffin being of sufficient qunatity to not only entirely absorb the liquid ingredients of the petroleum jelly but also to render the resulting product of a dry and brittle characteristic whereby clothes and the like are not soiled by contact therewith.

5. A brittle oil or lubricant of the class described consisting of a hydrocarbon compound having relatively high lubricating properties and being of relatively high viscosity at room temperature and paraffin, said paraffin being of sufficient quantity to not only entirely and completely absorb the liquid ingredients of the said hydrocarbon compound but also to render the resulting product of a dry and brittle characteristic whereby clothes and the like are not soiled by contact therewith.

HAROLD M. ROSEN.

CERTIFICATE OF CORRECTION.

Patent No. 1,920,161.   July 25, 1933.

HAROLD M. ROSEN.

It is hereby certified that error appears in the printed specification of the above numbered patent requiring correction as follows: Page 2, line 22, claim 3, strike out the words "said oil and"; and that the said Letters Patent should be read with this correction therein that the same may conform to the record of the case in the Patent Office.

Signed and sealed this 26th day of September, A. D. 1933.

F. M. Hopkins (Seal)   Acting Commissioner of Patents.

CERTIFICATE OF CORRECTION.

Patent No. 1,920,161.  July 25, 1933.

HAROLD M. ROSEN.

It is hereby certified that error appears in the printed specification of the above numbered patent requiring correction as follows: Page 2, line 22, claim 3, strike out the words "said oil and"; and that the said Letters Patent should be read with this correction therein that the same may conform to the record of the case in the Patent Office.

Signed and sealed this 26th day of September, A. D. 1933.

F. M. Hopkins (Seal)  Acting Commissioner of Patents.